United States Patent
Kelley, Jr.

(10) Patent No.: US 7,357,748 B2
(45) Date of Patent: Apr. 15, 2008

(54) LIMITED SLIP DIFFERENTIAL

(75) Inventor: William R. Kelley, Jr., Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 187 days.

(21) Appl. No.: 11/167,804

(22) Filed: Jun. 27, 2005

(65) Prior Publication Data

US 2006/0014601 A1    Jan. 19, 2006

Related U.S. Application Data

(60) Provisional application No. 60/587,373, filed on Jul. 13, 2004.

(51) Int. Cl.
*F16H 48/20* (2006.01)

(52) U.S. Cl. ............... 475/231; 475/150; 192/30 W; 192/84.6; 192/93 A; 192/110 B

(58) Field of Classification Search ........... 475/150, 475/231; 192/110 B, 93 A, 84.6, 30 W
See application file for complete search history.

(56) References Cited

U.S. PATENT DOCUMENTS

| | | | |
|---|---|---|---|
| 3,400,610 A | | 9/1968 | Taylor et al. |
| 4,805,486 A | | 2/1989 | Hagiwara et al. |
| 4,895,236 A | * | 1/1990 | Sakakibara et al. ........ 192/84.6 |
| 4,950,486 A | | 8/1990 | Ayer et al. |
| 5,080,640 A | | 1/1992 | Botterill |
| 5,160,004 A | * | 11/1992 | Scott et al. ............... 192/17 R |
| 5,279,401 A | | 1/1994 | Stall |
| 5,294,350 A | | 3/1994 | Murphy et al. |
| 5,570,765 A | * | 11/1996 | Patridge ..................... 192/15 |
| 6,561,939 B1 | * | 5/2003 | Knapke ...................... 475/150 |
| 6,571,928 B1 | | 6/2003 | Gassmann |
| 6,578,693 B2 | | 6/2003 | Mayr |
| 6,742,642 B1 | * | 6/2004 | Stevenson et al. ........ 192/54.52 |
| 6,959,799 B2 | * | 11/2005 | Fusegi et al. .............. 192/84.6 |
| 6,988,604 B2 | * | 1/2006 | Kelley, Jr. ................ 192/70.24 |
| 2003/0051968 A1 | * | 3/2003 | Mayr ....................... 192/93 A |
| 2003/0171182 A1 | | 9/2003 | Peura |
| 2003/0177860 A1 | | 9/2003 | Peura |
| 2004/0163916 A1 | * | 8/2004 | Showalter ................. 192/48.2 |
| 2004/0238311 A1 | * | 12/2004 | Parigger ................... 192/84.6 |
| 2006/0081437 A1 | * | 4/2006 | Puiu ........................ 192/70.23 |

FOREIGN PATENT DOCUMENTS

EP    0368140    8/1993

* cited by examiner

*Primary Examiner*—David D. Le
(74) *Attorney, Agent, or Firm*—Reising, Ethington, Barnes, Kisselle, P.C.

(57) ABSTRACT

A limited slip differential comprises a housing having an input, a first output, and a second output rotatably mounted in the housing. A friction clutch in the housing limits slip between the first output and the second output, and a mechanism in the housing applies an axial force to the friction clutch. The mechanism includes a rotatable actuating plate and a non-rotatable, back-up plate. A motor that rotates the actuating plate is controlled by an electronic motor control which has a feed back that is responsive to the force applied by the mechanism to the friction clutch. In one embodiment, the feed back measures the angular position of the rotatable actuating plate which is mounted on an angular contact bearing. The stain or slight axial movement of the outer race of the angular contact bearing is measured to provide the feed back to the electronic motor control.

7 Claims, 3 Drawing Sheets

LIMITED SLIP DIFFERENTIAL

REFERENCE TO RELATED APPLICATION

Applicant claims the benefit of U.S. Provisional Patent Application Ser. No. 60/587,373, filed Jul. 13, 2004.

FIELD OF THE INVENTION

This invention relates generally to differentials and more particularly to limited slip differentials.

BACKGROUND OF THE INVENTION

U.S. Pat. No. 5,279,401 granted to Eugen Stall Jan. 28, 1994 discloses in connection with FIG. 1 of the patent, a bevel gear, limited slip differential 108 that includes a friction clutch 121 for limiting the slip between an input ring gear 120 and an output side gear 116. An axial force is applied to the friction clutch by an actuating ring 128 that is displaced axially by a rotatable back-up ring 163. Back-up ring 163 is rotated by an electric motor 133 via pinion gear 135. Electric motor 133 is mounted on the cover of the differential housing 111 and drives pinion gear 135 by a radial shaft that extends through the cover into the housing 111. Electric motor 133 is controlled by signals indicating vehicle wheel slippage.

U.S. Pat. No. 5,279,401 granted to Eugen Stall Jan. 28, 1994 also discloses in connection with FIG. 2 of the patent, a planetary gear, limited slip differential 208 that includes a friction clutch 221 for limiting the slip between an input ring gear 220 and an output planetary carrier 216. An axial force is applied to friction clutch 221 by a ball ramp device comprising a rotatable and axially displaceable actuating ring 228 (that is displaced axially when rotated), a back-up ring 254 and intervening balls 249 that engage confronting ramps on the two rings. Actuating ring 228 is rotated by an electric motor 233 via pinion gear 235 at the end of a longitudinal shaft that is disposed in a passage that leads to the interior of housing 211. Electric motor 233 is mounted on the differential housing 211 and drives the shaft by a reduction gear set 232, 236. Electric motor 233 is controlled by signals indicating vehicle wheel slippage.

U.S. Pat. No. 6,571,928 B1 granted to Theodor Gassmann Jun. 3, 2003 discloses ball ramp engagement mechanisms in FIGS. 2, 3 and 4-6 for actuating a friction clutch in a limited slip differential. The ball ramp engagement mechanism of FIG. 2 is driven by an electric motor 58 via a reduction gear 60 that includes a spur gear that acts on a sector gear 56. The ball ramp engagement mechanism of FIG. 3 is driven by an electric motor via a reduction gear that includes a spur gear 76 that acts on a rack 74 which is an integral part of ball ramp disc 66. The ball ramp mechanism of FIGS. 4-6 is a double stage mechanism that includes a ball ramp disc 92 that is driven by a reduction gear 100 similar to the arrangement of FIG. 2.

U.S. Pat. No. 6,578,693 B2 granted to Nikolaus Mayr Jun. 17, 2003 discloses an axial setting device (ball ramp mechanism) comprising a setting disc 11 a pressure disc 17 and intervening balls 23 that engage confirmatory ramps of the discs 11, 17. Disc 11 is rotated by a worm gear 15 that is arranged tangentially with respect to the setting disc 11. Worm gear 15 is driven by electric motor 25.

U.S. Pat. No. 5,279,401; U.S. Pat. No. 6,571,928 B1; and U.S. Pat. No. 6,578,693 B2 are hereby incorporated in their entirety by reference.

SUMMARY OF THE INVENTION

The limited slip differential of the invention has a ball ramp engagement mechanism for actuating a friction clutch that limits slip in the differential. The engagement mechanism has a rotatable actuating plate, a non-rotatable back-up plate and intervening balls that engage confirmatory ramps of the plates. The back-up plate is displaced axially when the actuating plate is rotated by a worm gear. The actuating plate is preferably mounted on an angular ball bearing which provides feedback to a motor control for the electric motor that rotates the cooperating actuating plate.

The ball ramp mechanism is preferably driven by an electric motor via a worm gear drive. The worm gear drive provides a reduction gear that reduces space requirements while providing different gear ratios in the same space simply by changing the worm gear.

The electric motor is preferably mounted on the outside of the differential housing cover.

DETAILED DESCRIPTION OF PREFERRED EMBODIMENT

Figure 1:
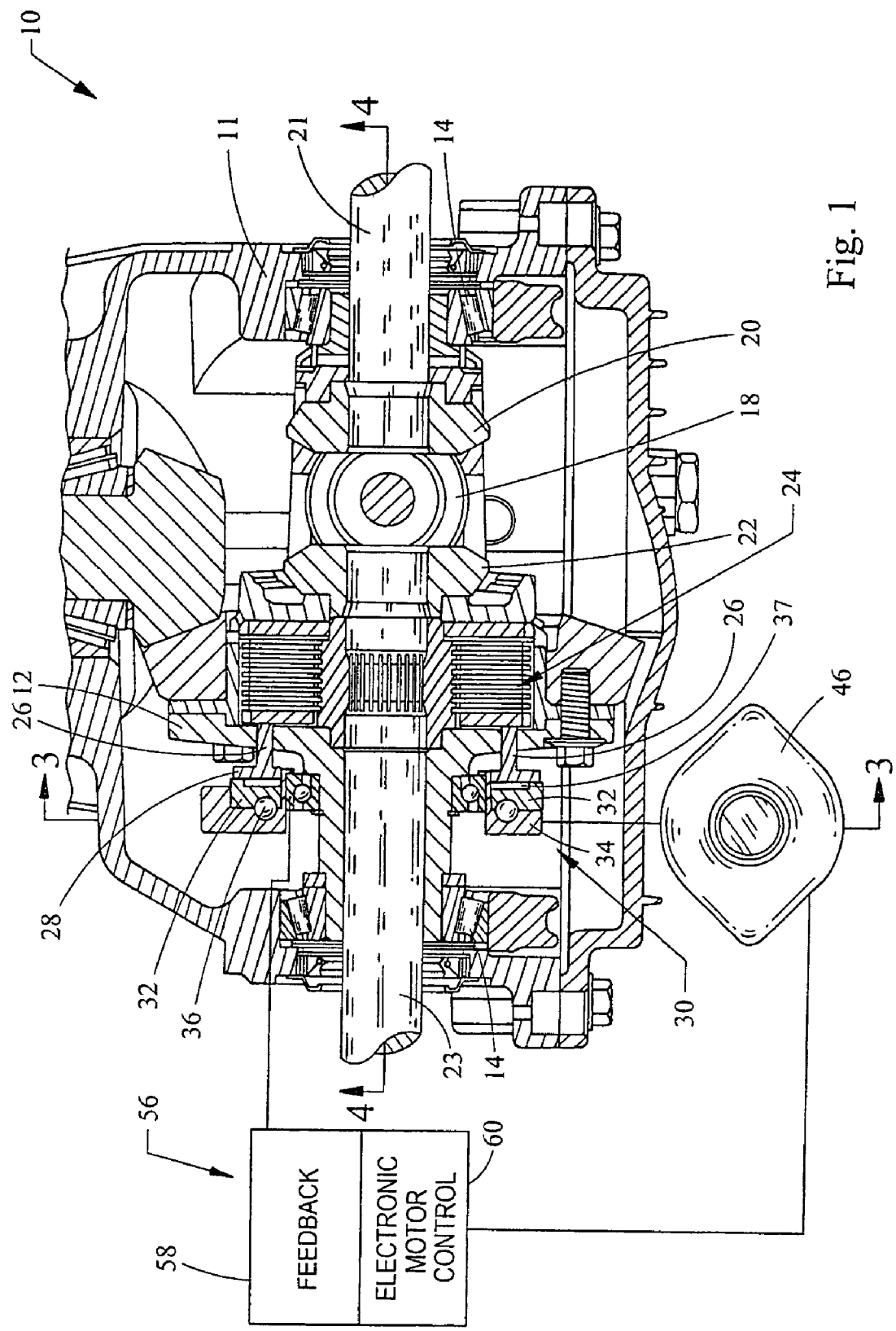
FIG. 1 is a partially schematic, horizontal section combined of a limited slip differential of the invention.
Figure 3:
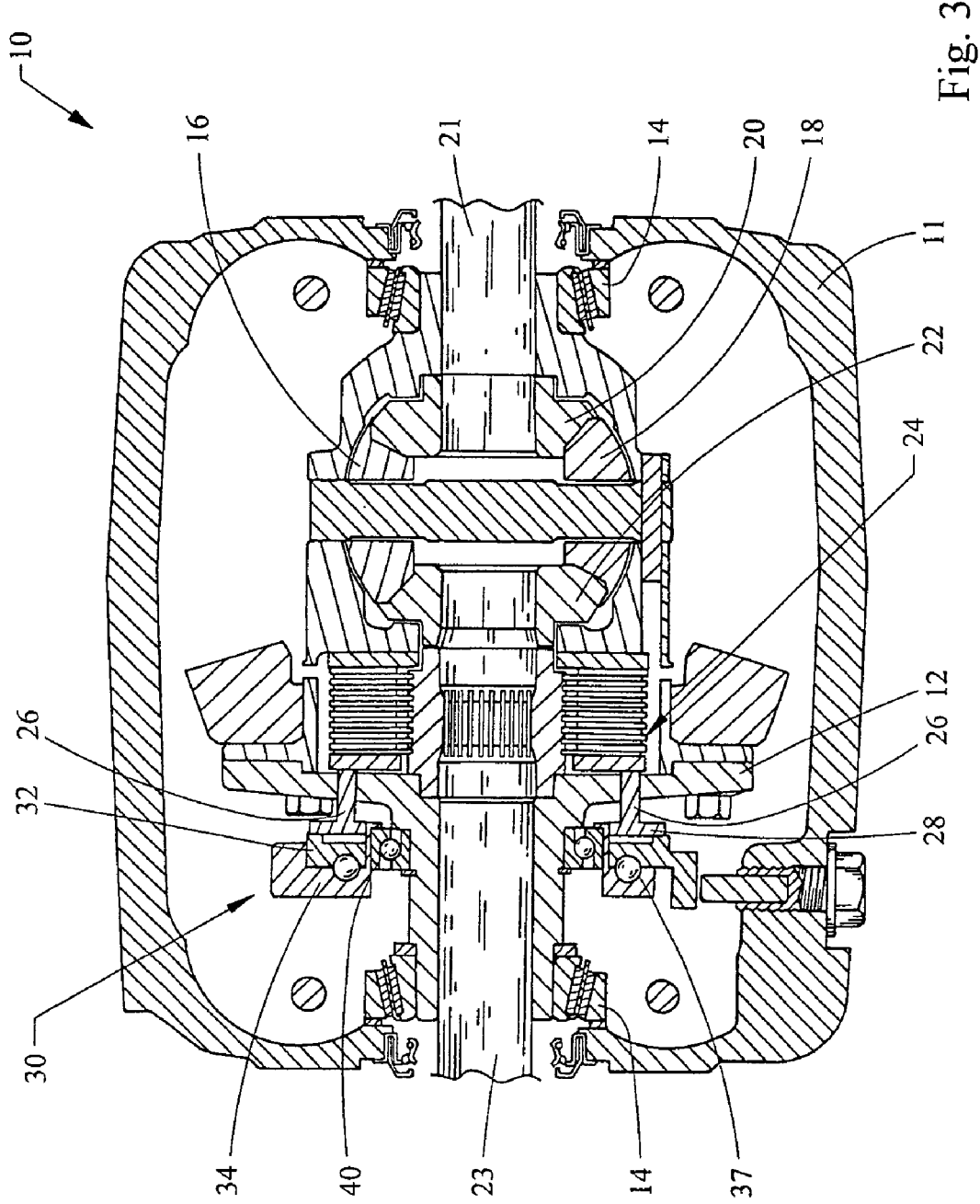
FIG. 3 is a section taken substantially along the line 3-3 of FIG. 1 looking in the direction of the arrows.

Referring first to FIGS. 1 and 3, the limited slip differential 10 of the invention comprises a housing 11 in which a differential case 12 is rotatably mounted by two tapered roller bearings 14 that are mounted in the housing. A conventional bevel gear set is located inside case 12. The conventional bevel gear set comprises two rotatable planet gears 16, 18 that mesh with two rotatable side gears 20, 22. Side gears 20, 22 are connected to two respective axle shafts 21, 23 which in turn are connected to respective vehicle wheels (not shown).

Differential 10 includes a conventional multi-plate friction clutch 24 comprising interleaved friction plates that are connected by sliding splines to the case 12 and side gear 22 alternately. Friction clutch 24 operates in a well known manner to clutch side gear 22 to case 12 to limit slip, that is, the speed differential between the side gears 20, 22. The limited slip characteristics are determined by the pressure or axial force that is applied to friction clutch 24.

Pressure is applied to friction clutch 24 by rods 26 that are pushed against the friction clutch (toward the right as shown in FIGS. 1 and 3) by a pressure plate 28. The pressure plate 28 itself is pushed toward the right by a cam loading or ball ramp mechanism 30 comprising a non-rotatable back-up plate 32 and a rotatable actuating plate 34 which in the case of a ball ramp mechanism are non-rotatable and rotatable ball ramp cams with a plurality of balls 36 disposed between the plates and engaging confronting ball ramps on the respective plates 32 and 34. A roller thrust bearing 37 is provided between pressure plate 28 and the non-rotatable back-up plate 32 to reduce friction between these two plates because pressure plate 28 rotates with case 12 while back-up plate 32 is limited to axial movement for making adjustments to the pressure that is applied to friction clutch 24 via pressure plate 28 and rods 26. Back-up plate 32 is limited to axial movement by a roll pin 43 that fits in an axial slot 41 of plate 32 as best shown in FIG. 4.

Figure 2:
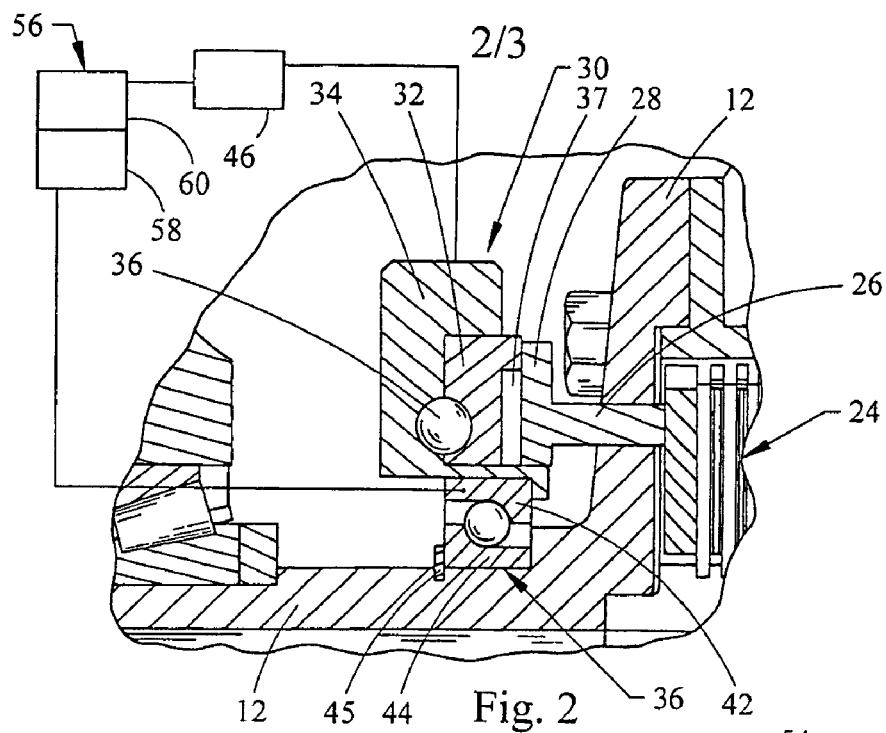
FIG. 2 is an enlargement of a portion of FIG. 1.

Operation of ball ramp mechanisms are well known and need not be explained in detail. Basically, plates 32 and 34 are spread apart when actuating plate 34 is rotated with respect to back-up plate 32 in one direction. For a more detailed explanation, reference may be made to the Gassman '928 patent identified above where the operation of a ball ramp mechanism is explained connection with the prior art FIGS. 2 and 3.

Figure 4:
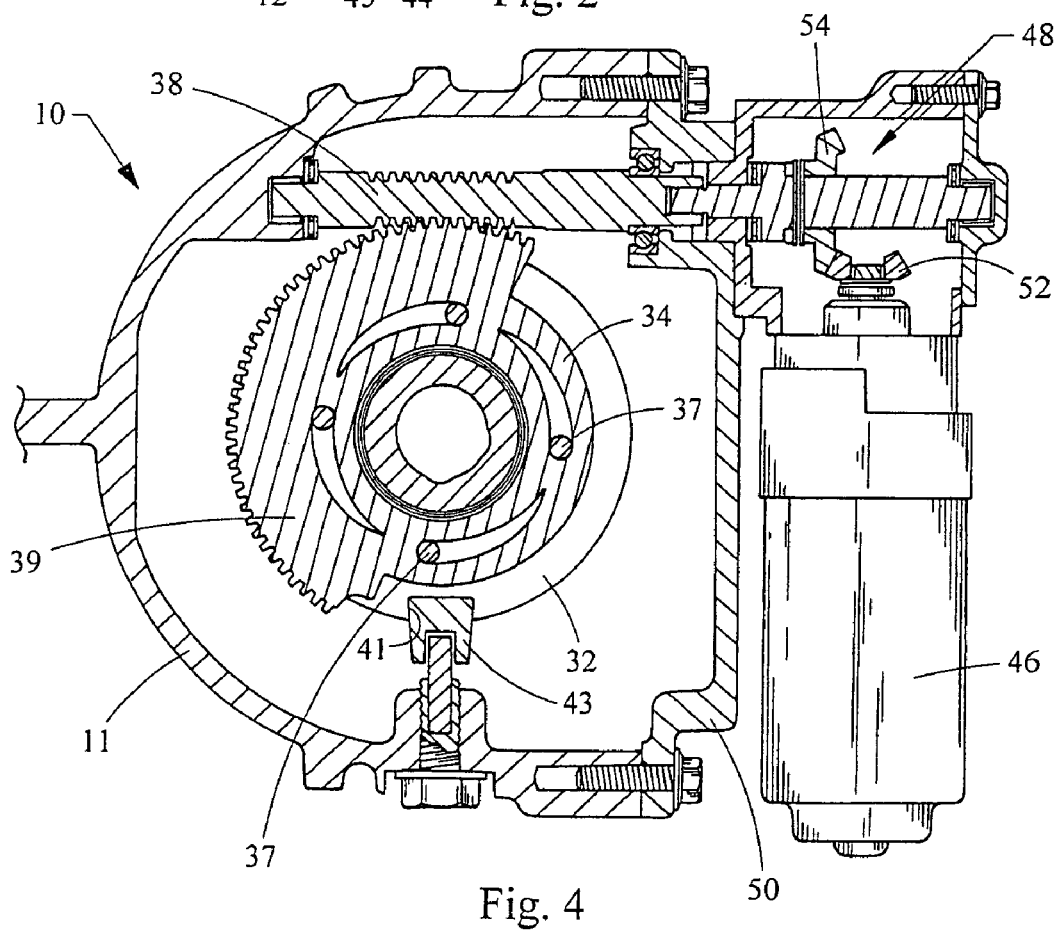
FIG. 4 is a section taken substantially along the line 4-4 of FIG. 1 looking in the direction of the arrows.

Actuating plate 34 is preferably rotated by a worm drive comprising a worm gear 38 that drives a sector shaped worm wheel 39 that is an integral part of the actuating plate 34 as best shown in FIG. 4. The worm gear drive provides a reduction gear that reduces space requirements while providing different gear ratios in the same space simply by changing worm gear 38. Alternatively, a crossed helical gear arrangement can be used for the worm drive. The crossed helical gear arrangement is similar to a worm gear except that the teeth are curved to envelope the worm inn a worm gear arrangement. The crossed helical gear arrangement allows for back driving the system so that the differential is an open differential in the event that the drive fails.

As indicated above, case 12 is rotatably mounted in housing 11 by opposed tapered roller bearings 14 at opposite ends of case 12. In addition an angular contact ball bearing 40 is provided between actuating plate 34 and case 12 so that case 12 rotates freely with respect to ball ramp mechanism 30. Bearing 40 carries a thrust load that corresponds to the pressure or axial force that the ball ramp mechanism 30 applies to friction clutch 24. Angular contact ball bearing 40 has an outer race 42 that is pressed into the bore of the actuating plate 34 against a radial inward thrust shoulder and an inner race 44 that is mounted on the rotatable case 12 between a thrust shoulder and a snap ring 45. An advantage of this arrangement is that the case 12 with gears 16, 18, 20, 22; clutch 24, rods 26 and cam loading mechanism 30 is an integrated, unit handled sub-assembly that can be shipped and installed in housing 11 at a different location.

The outer race 42 of the angular contact ball bearing 40 provides a force sensor input for a closed loop electronic control unit 56 by measuring either the strain on the angular contact bearing 42 or measuring the very slight axial displacement of the outer race 42 of the angular contact bearing 40 with respect to either the inner race 44 or housing 11 due to the strain on the angular contact bearing 40.

As indicated schematically in FIGS. 1 and 3, the stationary outer race 42 of the angular contact ball bearing 40 provides a feed back 58 to the electronic motor control 60 which controls electric motor 46. Feed back 58 may be a force sensor input that measures the strain on the angular contact bearing 40 or a displacement input that measures the very slight axial displacement of the of the outer bearing race 42 due to the strain on the angular contact bearing 40. Electronic motor control 60 also receives inputs from other sensors (not shown) such as a yaw rate sensor, lateral accelerometer, steering angle sensor, wheel speed sensors and throttle position sensor. These other inputs determine how much force should be applied to the friction clutch 24 to obtain the desired clutch characteristic while the input of feed back 58 determines how much force is already being applied to friction clutch 24. Electronic motor control 60 then determines the needed adjustment and then controls electric motor 46 to make the needed adjustment by indexing the rotatable actuating plate 34 via gear drive 48 and worm gear 38 as best shown in FIG. 4.

Electronic control unit 56, electric motor 46 and gear drive 48 are mounted on the housing cover 50. Gear drive 48 has a bevel gear input 52 from electric motor 46 which in turn drives bevel gear 54. Bevel gear 54 drives the worm gear 38 that is attached to the drive shaft of bevel gear 54. Worm gear 38 drives worm wheel 39 of ball ramp mechanism 30. This arrangement allows changing gear ratios simply by changing worm gear 38.

The above illustration of a preferred embodiment of the invention utilizes angular contact bearing 36 to provide feed back to the electronic motor control 60 by measuring either the strain on the angular contact bearing 40 or measuring the very slight axial displacement of the outer race 42 of the angular contact bearing 40 with respect to either the inner race 44 or housing 11 due to the strain on the angular contact bearing 40. Either measurement is indicative of the angular position of the outer race 42 and the actuating plate 34. Thus, it is also possible to provide feed back to the electronic sensor in the form of an angular position sensor for determining the angular position of the outer race 42 and actuating plate 34. For instance, a suitable angular position sensor may use a stationery Hall effect sensor or sensors in combination with a permanent magnet or magnets attached to the outer race 34 or actuating plate 34.

In other words, the invention has been described in an illustrative manner with respect to preferred embodiments, and it is to be understood that the terminology that has been used is intended to be in the nature of words of description rather than of limitation. Obviously, many modifications and variations of the present invention in light of the above teachings may be made. For example, the invention has been illustrated as adapted to a refueling valve assembly wherein the valve is operated with a hollow float but the valve could also be operated with another type of floatation device such as a cellular foam member having sufficient buoyancy. It is therefore to be understood that within the scope of the appended claims, the invention may be practiced otherwise than as specifically shown and described.

I claim:

1. A limited slip differential comprising:
    a housing having an input, a first output, and a second output rotatably mounted in the housing,
    a friction clutch in the housing for limiting slip between the first output and the second output, and
    a mechanism in the housing for applying an axial force to the friction clutch, the mechanism including a rotatable actuating plate and a non-rotatable, backup plate,
    a motor for rotating the actuating plate,
    an electronic motor control for operating the motor, and
    a feed back to the electronic motor control responsive to the force applied by the mechanism to the friction clutch wherein the rotatable actuating plate is mounted on an angular contact bearing and the feed back is provided by a race of the angular contact bearing.

2. The limited slip differential as defined in claim 1 wherein the mechanism is a ball ramp mechanism, the motor is an electric motor and the limited slip differential includes a force sensor or displacement sensor associated with the angular contact bearing and the electronic motor control to sense the axial force applied by the ball ramp mechanism to the friction clutch and provide a feed back to the electronic motor control for controlling the electric motor.

3. A limited Slip differential comprising:
    a housing having an input, a first output, and a second output rotatably mounted in the housing,
    a friction clutch in the housing for limiting slip between the first output and the second output, and a mechanism in the housing for applying an axial force to the friction clutch, the mechanism including a rotatable actuating plate and a non-rotatable, backup plate, a motor for rotating the actuating plate, an electronic motor control for operating the motor, and a feed back to the electronic motor control responsive to the force applied by the mechanism to the friction clutch wherein the rotatable actuating plate is mounted on an angular contact bearing and the feed back is associated with the angular contact bearing and the angular contact bearing has an outer race that provides the feed back to the electronic motor control.

4. A limited slip differential comprising:

a housing having an input, a first output, and a second output rotatably mounted in the housing, a friction clutch in the housing for limiting slip between the first output and the second output, and a mechanism in the housing for applying an axial force to the friction clutch, the mechanism including a rotatable actuating plate and a non-rotatable, backup plate, a motor for rotating the actuating plate, an electronic motor control for operating the motor, and a feed back to the electronic motor control responsive to the force applied by the mechanism to the friction clutch, wherein the feed back measures the angular position of the rotatable actuating plate, wherein the rotatable actuating plate is mounted on an angular contact bearing and the feed back is associated with the angular contact bearing, wherein the angular contact bearing has an outer race that provides the feed back to the electronic motor control, and wherein the strain or slight axial movement of the outer race of the angular contact bearing is measured to provide the feed back to the electronic motor control.

5. The limited slip differential as defined in claim 4 wherein the rotatable actuating plate is driven by a crossed helical gear arrangement.

6. The limited slip differential as defined in claim 4 wherein the rotatable actuating plate is driven by a worm drive and the actuating plate part of a worm wheel that engages a worm gear driven by the motor.

7. The limited slip differential as defined in claim 6 wherein worm gear is rotatably mounted inside the housing and the electric motor is mounted outside the housing and drives the worm gear via a shaft that extends through an opening of the housing so that worm gear is changeable.

* * * * *